No. 705,210. Patented July 22, 1902.
A. S. CUMMINS & A. J. BLAND.
TRAIN PIPE HOSE COUPLING.
(Application filed Jan. 30, 1902.)
(No Model.)
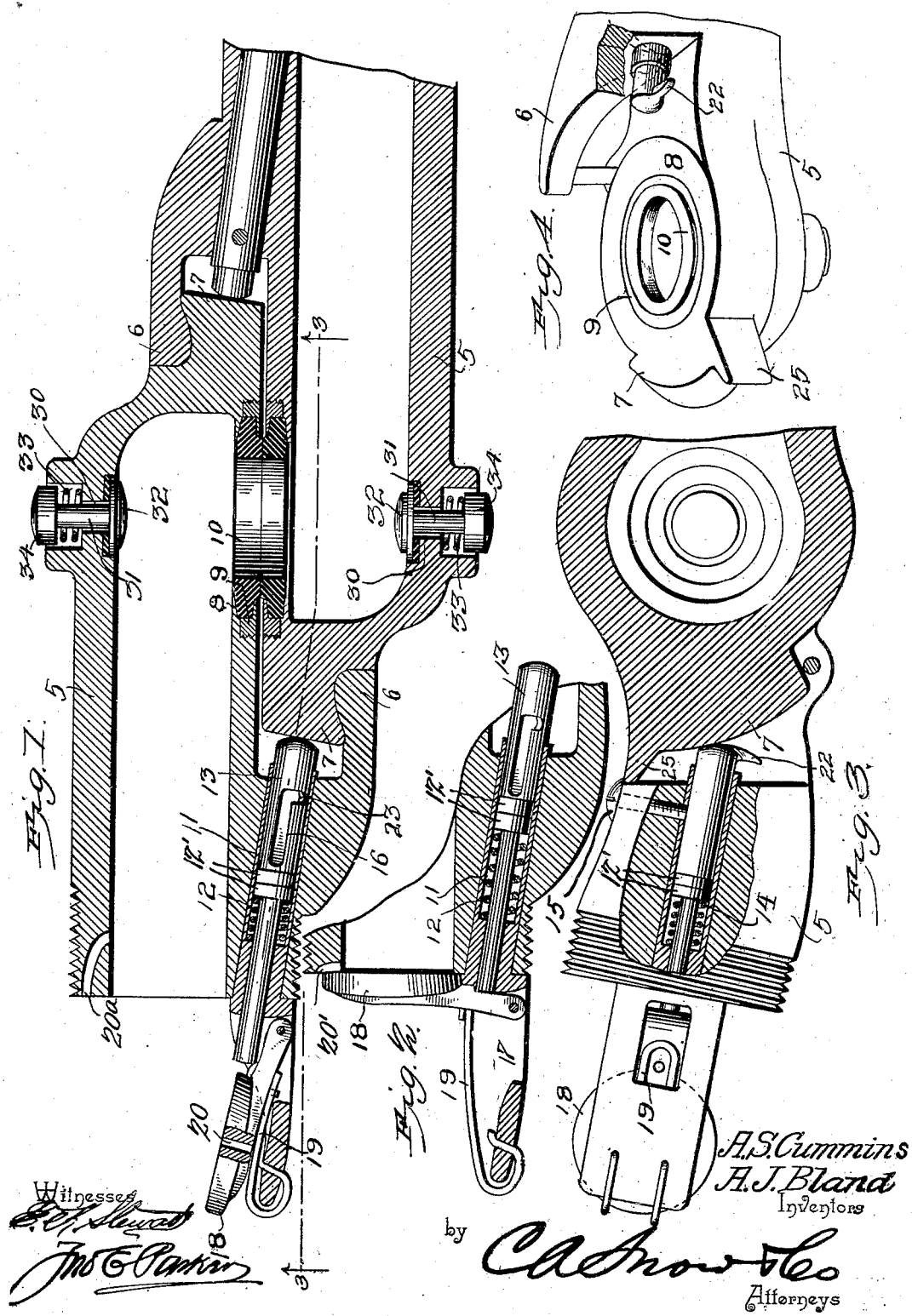
Witnesses
A.S.Cummins
A.J.Bland
Inventors
by C.A.Snow & Co
Attorneys

UNITED STATES PATENT OFFICE.

ARCHER SEAYMORE CUMMINS AND ANDREW JACKSON BLAND, OF CREWE, VIRGINIA.

TRAIN-PIPE HOSE-COUPLING.

SPECIFICATION forming part of Letters Patent No. 705,210, dated July 22, 1902.

Application filed January 30, 1902. Serial No. 91,906. (No model.)

*To all whom it may concern:*

Be it known that we, ARCHER SEAYMORE CUMMINS and ANDREW JACKSON BLAND, citizens of the United States, residing at Crewe, in the county of Nottoway and State of Virginia, have invented a new and useful Train-Pipe Hose-Coupling, of which the following is a specification.

Our invention relates to certain improvements in hose-couplings for train-pipes, and has for its principal object to provide a coupling which will prevent any sudden reduction of the train-pipe pressure in the event of the parting of the train, and thus avoid danger of collision between the sections of a parted train, the engineer being notified of the accident and being enabled to proceed with the forward section while the brakes of the rear section are so applied as to gradually check its speed.

A further object of the invention is to provide in a device of this class an internal valve which may be moved automatically to open position when the members of the coupling are connected and in which the valve when open will not in any manner interfere with the passage of air or steam through the coupling.

A still further object of the invention is to provide a coupling member which may be adjusted for connection with a coupling member of the class in ordinary use.

A still further object of the invention is to provide in the coupling members for the escape of the air or steam pressure in the hosing-couplings after the angle-cocks have been closed to enable the more ready separation of the coupling members.

With these and other objects in view the invention consists in the novel construction and combination of parts hereinafter described, illustrated in the accompanying drawings, and particularly pointed out in the appended claims.

In the drawings, Figure 1 is a longitudinal sectional elevation of a pair of coupling members made in accordance with our invention. Fig. 2 is a similar view of a portion of one of the coupling members, illustrating the position assumed by the closing-valve when the coupling members are separated. Fig. 3 is a horizontal sectional view of the couplings on the line 3 3 of Fig. 1. Fig. 4 is a perspective view, partially in section, of a portion of one of the coupling members.

Similar numerals of reference are employed to indicate corresponding parts throughout the several figures of the drawings.

Each coupling member resembles in general contour the hose-coupler in ordinary use, comprising a main or body portion 5 and interlocking cam-flanges 6 and 7. In the adjacent flat faces 8 of each member is a threaded opening for the reception of a bushing 9, which conforms in place a yielding gasket 10 in order to provide an air-tight joint. The coupler-heads will usually be formed of malleable iron, and the bushing-rings 9 are formed of brass or some similar metal in order to prevent oxidation or corrosion at the joint.

In the body of the coupling, at a point extending rearwardly from the wall of the recess below flange 6, is an inclined opening 11, adapted for the reception of a brass bushing 12, the outer portion of the bushing being tubular in form and adapted for the reception and guidance of a pin 13, which projects into the path of the cam-flange 7 of a mating coupling member. The stem of the pin, which has a packing 12' to prevent the escape of air, projects rearwardly through the end of the bushing and is surrounded at a point within the tubular portion of the bushing by a coiled compression-spring 14, which normally tends to hold the pin in the position illustrated in Fig. 2, excessive movement being prevented by a pin or screw 15, extending through the body of the coupling and engaging in a groove 16 in the head of the pin. At the rear of the bushing is a recess 17, in which is pivoted a disk valve 18, which is normally held in the closed position (shown in Fig. 2) by a spring 19. The valve is closed when the coupling members are separated and is automatically opened by the engagement and interlocking of the cam-flanges 6 and 7 of a pair of coupling members, the cam-flange 7 bearing against the head of the pin 13 and forcing the same to the rear against the action of the compression-spring 12, the shank portion of the pin coming into contact with and moving the valve to the open position, as illustrated in Fig. 1. In each of the disk valves 18 is a leakage-opening 20, through which the air from the train-pipe may slowly pass when the valve is in closed position.

One of the principal objections to the hose-couplings in ordinary use is that in the event of the parting of a train and the consequent separation of the members of the coupling the train-pipe is fully open, the sudden reduction of the pressure causing a movement of the triple valve similar to that which occurs in an emergency stop and effecting the application of the brakes under full pressure. This quick and powerful operation of the brakes is injurious to both the braking mechanism and the rolling-stock, and in the event of the failure of any of the brakes on either section of the train, or if the rear section be heavier than the forward section, there is always danger of a collision. This objection is overcome by the employment of a coupler constructed in accordance with our invention, the parting of the coupling members causing the valve 18 in each member to automatically close and preventing any sudden reduction of train-pipe pressure. The leakage-opening 20 is of such size as to permit of the gradual escape of air and to effect the usual movement of the triple valve, such as would occur by an ordinary service application of the brakes. Such a movement of the brakes will occur on the rear section of the train, but on the forward section the engineer, being promptly notified of the accident by his train-pipe gage, may keep up the train-pipe pressure by moving his brake-valve to full release position, the leakage-opening 20 being too small to permit of the escape of sufficient air to overcome the supply from the main reservoir. The engineer is thus enabled to proceed with the forward section of the train while the rear is gradually brought to a stop.

In order to enable the coupler to be attached to a coupling member of the type in ordinary use, a small handle is arranged at the end of each of the pins 13, as indicated at 22 in Figs. 3 and 4, and the slot 16 of the pin is extended, as at 23, at a right angle to the length of the slot to form a locking-recess, which may be turned into engagement with the end of the pin or screw 15, the pin 13 being first forced to the rear to move the valve 18 to the open position. It will be observed that the valve when in open position is practically out of alinement with the air-passage formed in the main body of the coupling members, so that it will not in any manner interfere with the free passage of the air or steam.

In order to prevent as far as possible the clogging of the end of the pin 13 by dirt or other matter which may accumulate during running, we extend the upper part of the flange 7, as indicated at 25, said extended portion fitting within the recess formed below the flange 6 and fully closing the same, as indicated in Fig. 3.

The air or steam pressure serves to bind the coupling members together to a degree which makes it a matter of some difficulty to separate them even after the angle-cocks are closed, and in order to accomplish this result more readily we form in each coupling-head a recess or opening 30 for the reception of a valve-stem 31, having a disk valve 32, adapted to be seated against the head at the inner end of the opening, the valve being retained in closed position partly by the pressure of air and partly by a coiled compression-spring 33, which extends around the valve-stem, one end bearing against the body of the coupling and the other against a finger knob or button 34. When the coupling members are to be separated, the angle-cocks are first closed, and one or both of the valves 32 are opened by pressing on the knobs or buttons 34, permitting the air in the hose to escape, after which the coupling members may be readily separated.

Although we have described the valve 18 as provided with a leakage-opening 20 to permit of the gradual escape of air from the train-pipe it will be understood that such leakage may be provided for by arranging a leakage-groove in the valve-seat or in the valve proper, as indicated at 20' in Fig. 2, or the same result may be accomplished by forming a small passage in the body of the coupler, as indicated at 20ª in Fig. 1, or said opening or groove or passage may be arranged at any other point to permit of the gradual escape of the air after the valve is closed without departing from our invention.

Having thus described our invention, what we claim is—

1. A combination in a coupler, of a disk valve adapted to a seat at the inner portion of the coupler-head and fulcrumed at a point out of alinement with the air-passage, a spring for closing said valve, a pin adapted to engage with said valve to open the same, a spring normally tending to move the pin from contact with the valve, the head of said pin being disposed in the path of movement of a mating coupling, and a leakage-opening for permitting the reduction of the train-pipe pressure when the valve is closed.

2. The combination in a coupler, of a spring-pressed valve, a spring-pressed pin adapted to engage therewith, the head of said pin being disposed in the path of movement of a mating coupler, and means for limiting the movement of said pin.

3. The combination in a coupler, of a disk valve adapted to a seat at the inner portion of the coupling-head and fulcrumed at a point out of alinement with the air-passage, and a spring-pressed pin disposed in the path of movement of a mating coupler, and adapted to engage said valve.

4. The combination in a coupler, of the coupling-head, a bushing carried thereby, a pin guided in said bushing and having one end in the path of movement of a mating coupling, and a disk valve fulcrumed at a point to one side of the air-passage and adapted to be engaged by said pin.

5. The combination in a coupler, of the coupling-head, a bushing carried thereby, a pin guided in said bushing and having one end in the path of movement of a mating coupling, said pin having a locking-groove, a valve adapted to be acted upon by said pin, and a locking-pin carried by the coupling-head for engagement in said locking-groove thereby to lock the valve in open position.

6. The combination in a coupler having cam-flanges, of a protecting-cover forming part of one of said flanges and adapted to close the recess of a mating coupling, substantially as specified.

In testimony that we claim the foregoing as our own we have hereto affixed our signatures in the presence of two witnesses.

ARCHER SEAYMORE CUMMINS,
ANDREW JACKSON BLAND.

Witnesses:
W. W. BLAND,
H. D. WEATHERFORD.